Nov. 16, 1971  KIYOSHI KITAI  3,620,151

APERTURE CONTROLLING DEVICE IN FLASH PHOTOGRAPHY

Filed Dec. 30, 1968

United States Patent Office 3,620,151
Patented Nov. 16, 1971

3,620,151
APERTURE CONTROLLING DEVICE IN FLASH PHOTOGRAPHY
Kiyoshi Kitai, Tokyo, Japan, assignor to Kabushiki Kaisha Hattori Tokeiten, Tokyo, Japan
Filed Dec. 30, 1968, Ser. No. 787,726
Claims priority, application Japan, Mar. 21, 1968, 43/18,148
Int. Cl. G03b 7/16, 9/06
U.S. Cl. 95—64 A     5 Claims

ABSTRACT OF THE DISCLOSURE

Apparatus for adjusting the exposure aperture for a camera in conjunction with the flash operation thereof, the apparatus including a manually operated device and a control lever responsive thereto, a movable lever responsive to the focusing mechanism and an exposure aperture adjusting member. The exposure aperture adjusting member is moved automatically to adjust the exposure aperture to the proper value for taking a picture utilizing associated flash equipment in response to the guide number set by the guide number setting device and the distance value set by the focusing mechanism.

---

The present invention relates to aperture adjusting mechanism utilized in conjunction with flash equipment. In the present invention, it is possible automatically to adjust the value of the lens aperture merely by setting the guide number with the guide number setting means and setting the distance value with the focusing mechanism.

According to the present invention, the apparatus includes an aperture controlling member adapted to rotate about an axis which is offset from the optical axis of the camera, guide number means the position of which is settable in accordance with the selected guide number, and a distance lever which has a wedge-shaped cam portion interposed between the aperture controlling member and the guide number means and which is connected to a focusing member for movement therewith, whereby movement of said distance lever in response to focusing movement of said focusing member adjusts the aperture controlling member. Preferably, said focusing member has a rotary shaft and the distance lever is pivotally mounted on said shaft, said member and the said lever being movable together in an axial direction. The aperture controlling member may have a control surface engageable by a pin which is mounted on a member operating the diaphragm blade. The automatic adjusting apparatus of the present invention may be utilized by a helicoid lens tube camera or a front element focusing camera.

An object of the present invention is to provide an improved apparatus that automatically adjusts the value of the lens aperture of a camera when taking a picture utilizing associated flash equipment, by adjusting the focusing mechanism for the camera and by setting a guide number means.

Another object of the present invention is to provide for a camera, a lens aperture adjusting apparatus, utilized with associated flash equipment, that is more efficient, is less complex and costs less to manufacture.

Having in mind the above and other objects that will be evident from an understanding of this disclosure, the invention comprises the devices, combinations and arrangements of parts as illustrated in the presently preferred embodiment of the invention which is hereinafter set forth in such detail as to enable those skilled in the art readily to understand the funciton, operation, construction and advantages of it when read in conjunction with the accompanying drawings.

Figure 1:
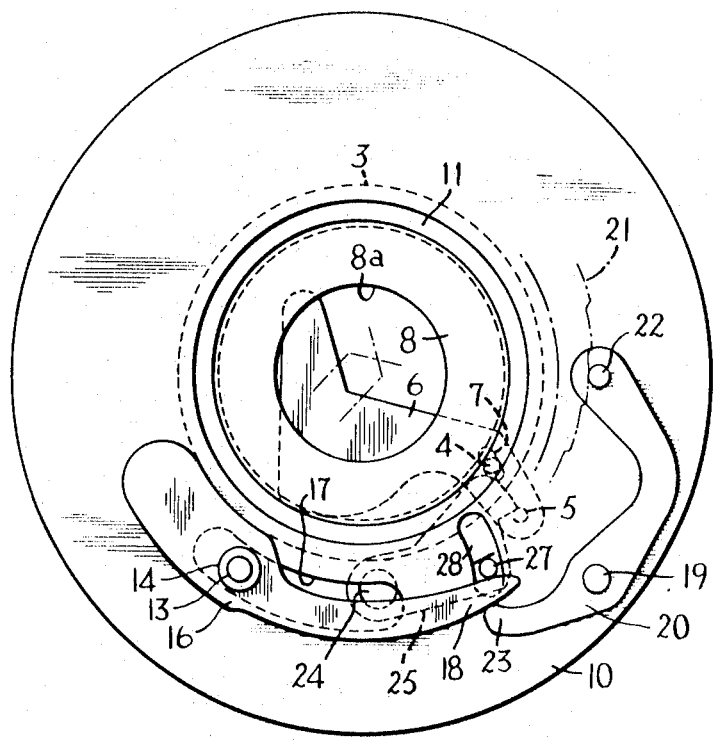
Figure 2:
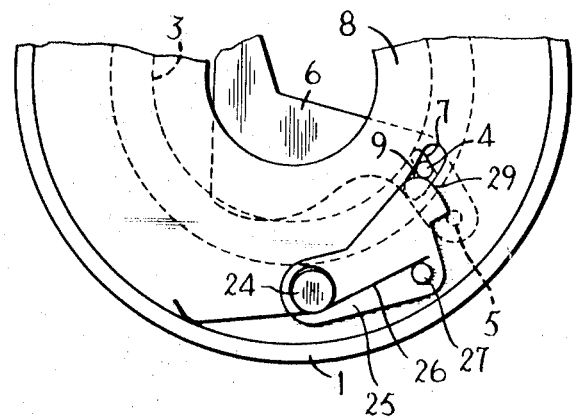
Figure 3:
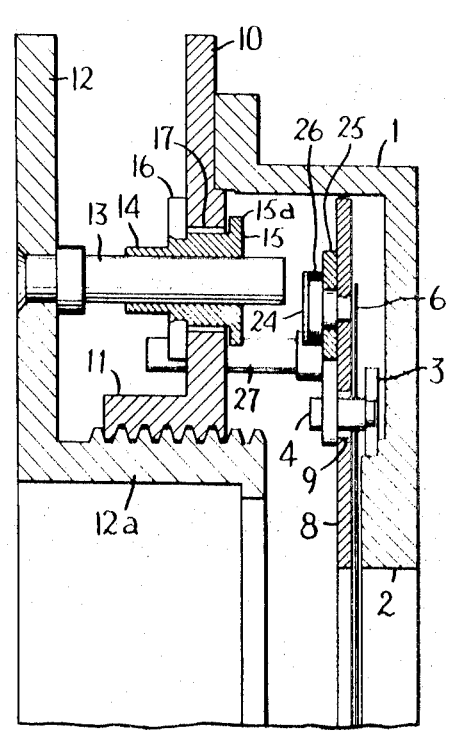

FIG. 1 is a front elevational view of the apparatus of the present invention.
FIG. 2 is a front elevational view of a portion of the apparatus shown in FIG. 1 with its front plate removed.
FIG. 3 is an enlarged vertical sectional view of a portion of the apparatus shown in FIG. 1.

DESCRIPTION OF THE PREFERRED EMBODIMENT

Referring now to the drawings, a shutter casing 1 defines a centrally located circular opening 2 and a ring 3 is rotatable around the opening 2. A ring pin 4 being secured to the ring 3 and extending transversely thereof through an elongated groove 9 formed in a circular holding plate 8 in turn formed with a centrally located opening 8a. The ring pin 4 is also received in a control groove 7 formed in a diaphragm blade 6, which diaphragm blade 6 is pivotally mounted on a shaft 5, secured to the holding plate 8.

A connecting shaft 13 is mounted by one end section thereof to a focusing ring 12 and extends inwardly (FIG. 1) from the focusing ring 12 through a centrally apertured elongated sleeve-like block 14. The focusing ring 12 includes an inwardly extending (FIG. 3) threaded portion 12a which is threadedly engaged by a threaded boss 11 formed on a front plate 10, which plate 10 includes an elongated slot 17 which in turn receives an end portion of the sleeve like block 14 in a loose sliding fit. The front plate 10 is sandwiched between a boss 15a formed on the inwardly extending (FIG. 3) end section of the sleeve block 14 and an movable distance lever 16 which is also mounted upon the sleeve-like, stepped, block 14 intermediate the ends thereof, thereby restraining the endwise movement of the stepped block 14, i.e., parallel to the light axis of the lens which, as can be understood by reference to FIG. 3, extends in a horizontal direction.

Mounted on the threaded boss 11 is a manually operable rotatable guide number cam plate 21 which is slidably engaged by a cam follower pin 22 connected to and extending outwardly from one surface of and end section of a substantially U-shaped guide number lever 20, which is pivotally mounted intermediate its ends of a shaft 19 which in turn is mounted on the front plate 10. The other end section of the lever 20 is formed into a control arm 23.

An aperture lever 25 is pivotally mounted on a shaft 24 in turn mounted on a holding plate 8 and includes a cam surface 29 which slidably engages the ring pin 4. The aperture lever 25 is urged in a clockwise (FIG. 2) direction by a spring 26 one end section of which contacts an aperture lever pin 27 that is mounted upon the aperture lever 25, and the other end section of which is wrapped about the shaft 24. The aperture lever pin 27 is received by an elongated groove 28 formed in the front plate 10 and extends transversely of and outwardly (FIG. 3) of the front plate 10. The distance lever 16 includes a wedge-shaped cam portion 18 having a width which, beginning at its pointed free end, gradually increases along its length extending back towards the stepped block 14 upon which it is mounted. As can be understood by reference to FIG. 1, the cam portion 18 is interposed between the control arm 23 and the aperture lever pin 27 such that as the distance lever 16 is moved the space between the aperture lever pin 27 and the free end of the control arm 23 varies depending upon the width of the cam portion section 18 at the point at which the portion 18 contacts the pin 27 and the free end of the control arm 23. Since the aperture lever 25 is biased in a clockwise direction (FIG. 2) the aperture lever pin 27 is also biased in a clockwise direction and as can be seen from FIG. 1 the pin 27 exerts a force on the distance lever 16 which in turn tends to move the control arm 23 of the guide number lever 20 in a counterclockwise direction about the shaft 19, thereby urging the cam follower pin 22 into engagement with the cam surface of the guide number cam plate 21.

Turning now to the operation of the apparatus, when the operator plans to take a picture of a subject when it is required to use the flash equipment properly to light the subject, the operator rotates the guide number cam plate 21 so that the camera is set for appropriate guide number required by the flash device being used, and in that position the cam follower pin 22 on the guide number lever 20 will be engaged by the cam 21 to set its position. Next, when the focusing ring 12 is rotated to select an appropriate distance value, the shaft 13 is also rotated, and this rotation will be transmitted by the stepped block 14 to the distance lever 16 to squeeze the wedge-shaped cam portion 18 of the lever 16 between the aperture lever pin 27 and the control arm 23 of the lever 20, whereby to adjust the spacing therebetween. However, movement of the aperture lever 25 will cause a variation of the relative position of the pin 4 along the cam surface 29 of the lever 25, and consequently the aperture opening of the diaphragm blade 6 will be varied.

Numerous alterations of the structure herein disclosed will suggest themselves to those skilled in the art. However, it is to be understood that the present disclosure relates to a preferred embodiment of my invention which is for purposes of illustration only and not to be construed as to limitation of the invention. All such modifications which do not depart from the spirit of the invention are intended to be included within the scope of the appended claims.

What I claim and desire to secure by Letters Patent is:

1. An aperture control mechanism for automatically controlling the aperture in a photographic camera in accordance with a selected distance value and a guide number of the flash device being used, said mechanism comprising a casing for fixed mounting in a camera, movably mounted diaphragm aperture means for opening and closing the aperture of said camera, adjustable aperture control means for engaging said diaphragm aperture means to control movement thereof, said aperture control means including a controlling member, means mounting said controlling member to said casing for pivotal movement about an axis which is offset from the optical axis of the camera, a guide number setting member movably connected to said casing and positionable in accordance with a selected guide number, a distance member having a cam surface interposed between and engaging both the aperture controlling member and the guide number setting member, a focusing member, and means connecting said focusing member to said distance member for movement therewith so that movement of said distance member in response to focusing movement of said focusing member pivotally adjusts the aperture controlling member.

2. An aperture control mechanism as claimed in claim 1, wherein said focusing member has a shaft-like projection and the said distance member is mounted on said projection for axial movement therewith.

3. An aperture control mechanism as claimed in claim 1 in which said aperture diaphragm means includes a diaphragm blade, said adjustable aperture control means further includes a pin movably mounted to said casing in engagement with said diaphragm blade, and wherein said aperture controlling member has a control surface engageable by said pin for operating said diaphragm blade.

4. An aperture control mechanism as set forth in claim 1, in which said cam surface of said distance member includes a portion that gradually increases in width along the length thereof, said cam surface being slideably engaged with said controlling member and said guide number setting member, to pivotally adjust said controlling member in response to focusing movement of said focusing member.

5. An aperture control mechanism as set forth in claim 4, wherein said focusing member includes a manually operable focusing ring and wherein said means connecting said distance member to said focusing member includes a connecting shaft connected to said focusing ring, and a sleeve receiving a portion of said connecting shaft, said sleeve being connected to said distance member so that as said focusing ring is rotated, movement is imparted to said distance member to move said cam surface between said controlling member and guide number setting member.

References Cited
UNITED STATES PATENTS

| | | | |
|---|---|---|---|
| 3,228,314 | 1/1966 | Koppen | 95—44 X |
| 3,273,483 | 9/1966 | Weidner et al. | 95—64 A |
| 3,326,108 | 6/1967 | Kitai | 95—64 |
| 3,344,723 | 10/1967 | Rentschler | 95—64 A X |
| 3,358,571 | 12/1967 | Lange | 95—64 X |
| 3,496,849 | 2/1970 | Winkler et al. | 95—64 A X |

SAMUEL S. MATTHEWS, Primary Examiner

J. F. PETERS, JR., Assistant Examiner

U.S. Cl. X.R.

95—44 R